(12) United States Patent
Lor et al.

(10) Patent No.: US 10,227,021 B2
(45) Date of Patent: Mar. 12, 2019

(54) INITIALIZATION OF CLOSED LOOP CONTROL FOR VEHICLE STOPPING

(71) Applicant: GM Global Technology Operations LLC, Detroit, MI (US)

(72) Inventors: Love Lor, Farmington Hills, MI (US); Adam J. Heisel, South Lyon, MI (US); Nathaniel S. Michaluk, Commerce Township, MI (US); Robert L. Morris, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/459,570

(22) Filed: Mar. 15, 2017

(65) Prior Publication Data
US 2018/0264971 A1    Sep. 20, 2018

(51) Int. Cl.
*B60L 15/20*     (2006.01)
*B60K 1/02*      (2006.01)
*B60K 6/365*     (2007.10)
*B60W 10/06*     (2006.01)
*B60W 10/08*     (2006.01)

(52) U.S. Cl.
CPC .......... *B60L 15/20* (2013.01); *B60L 2240/12* (2013.01); *B60L 2240/423* (2013.01); *B60L 2240/52* (2013.01); *B60L 2250/26* (2013.01); *Y02T 10/6286* (2013.01); *Y02T 10/7241* (2013.01); *Y02T 10/7275* (2013.01)

(58) Field of Classification Search
CPC .......... B60K 1/02; B60K 6/365; B60K 6/446; B60W 10/06; B60W 10/08
See application file for complete search history.

(56) References Cited

U.S. PATENT DOCUMENTS 6,590,299 B2    7/2003 Kuang et al.
RE40,164 E      3/2008 Kuang et al.
(Continued)

OTHER PUBLICATIONS

Mark L. Selogie, General Motors LLC, "One-Pedal Driving—Bringing Out Unparalleled Drivability in Electrified Vehicles", presentation presented at SAE 2017 Hybrid and Electric Vehicle Technologies Symposium, 2 p.m. session, Wednesday, Feb. 8, 2017, San Diego, California, USA, 31 pages.
(Continued)

*Primary Examiner* — Thomas Ingram
*Assistant Examiner* — Martin A Weeks

(57) ABSTRACT

A road load module is configured to determine a road load torque to maintain zero vehicle acceleration. An initialization module is configured to determine an initial torque based on the road load torque. A closed loop (CL) module is configured to: when a CL state transitions from an inactive state to an active state, set a CL torque to the initial torque; and when the CL state is in the active state after transitioning to the active state, adjust the CL torque based on a difference between a target vehicle speed and a vehicle speed. A motor torque module is configured to determine a motor torque command based on the CL torque and a motor torque request determined based on an accelerator pedal position. A switching control module is configured to, based on the motor torque command, control switching of an inverter and apply power to an electric motor.

20 Claims, 8 Drawing Sheets

(56) References Cited

U.S. PATENT DOCUMENTS

| | | |
|---|---|---|
| 7,695,401 B2 | 4/2010 | Soliman et al. |
| 7,698,044 B2 | 4/2010 | Prakash et al. |
| 7,739,016 B2 * | 6/2010 | Morris ............... B60K 1/02 303/112 |
| 7,743,860 B2 | 6/2010 | Soliman et al. |
| 7,801,658 B2 * | 9/2010 | Ohshima ............ B60K 31/047 123/349 |
| 7,828,694 B2 | 11/2010 | Silveri et al. |
| 9,463,800 B2 | 10/2016 | Jang et al. |
| 9,809,130 B2 | 11/2017 | Heisel et al. |
| 9,931,963 B2 | 4/2018 | Heisel et al. |
| 2003/0085576 A1 | 5/2003 | Kuang et al. |
| 2004/0195017 A1 * | 10/2004 | Braun ................. B60K 6/48 180/65.25 |
| 2009/0118964 A1 * | 5/2009 | Snyder .............. B60K 6/365 701/99 |
| 2013/0184906 A1 | 7/2013 | Harper |
| 2013/0338861 A1 * | 12/2013 | Hessell .............. B60K 6/445 701/22 |
| 2015/0066268 A1 | 3/2015 | Park et al. |
| 2015/0081150 A1 | 3/2015 | Wolff et al. |
| 2015/0197240 A1 | 7/2015 | Yamazaki et al. |
| 2016/0082969 A1 | 3/2016 | Jang et al. |
| 2016/0318501 A1 | 11/2016 | Oldridge |

OTHER PUBLICATIONS

U.S. Appl. No. 15/079,596, filed Mar. 24, 2016, Heisel et al.
U.S. Appl. No. 15/079,412, filed Mar. 24, 2016, Heisel et al.
U.S. Appl. No. 15/459,486, filed Mar. 15, 2017, Love Lor.

\* cited by examiner

INITIALIZATION OF CLOSED LOOP CONTROL FOR VEHICLE STOPPING

CROSS-REFERENCE TO RELATED APPLICATIONS

This application is related to U.S. patent application Ser. No. 15/459,486 filed on Mar. 15, 2017. The disclosure of the above application is incorporated herein by reference in its entirety.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle engines and motors and more particularly to systems and methods for controlling vehicle speed.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In addition to an internal combustion engine, or as an alternative to an internal combustion engine, some vehicles may include one or more electric motors or motor generators that generate propulsion torque. Such vehicles are sometimes referred to as hybrid vehicles or electric vehicles.

SUMMARY

In a feature, an electric motor control system for a vehicle is described. A road load module is configured to determine a road load torque to maintain zero vehicle acceleration. An initialization module is configured to determine an initial torque based on the road load torque. A closed loop (CL) module is configured to: when a CL state transitions from an inactive state to an active state, set a CL torque to the initial torque; and when the CL state is in the active state after transitioning to the active state, adjust the CL torque based on a difference between a target vehicle speed and a vehicle speed. A motor torque module is configured to determine a motor torque command based on the CL torque and a motor torque request determined based on a position of an accelerator pedal. A switching control module is configured to, based on the motor torque command, control switching of an inverter and apply power to an electric motor of the vehicle.

In further features, the initialization module is configured to determine the initial torque further based on a driver torque request determined based on the position of the accelerator pedal.

In further features, the initialization module is configured to: determine a change based on a difference between a previous value of the driver torque request and the driver torque request; and determine the initial torque based on the change and the road load torque.

In further features, the initialization module is configured to: determine a change based on a difference between a previous value of the motor torque command and the motor torque command; and determine the initial torque based on the change and the road load torque.

In further features, the motor torque module is configured to determine the motor torque command based on a sum of the CL torque and the motor torque request.

In further features, the CL module is configured to, when the CL state is in the active state after transitioning to the active state, adjust the CL torque to adjust the vehicle speed toward the target vehicle speed.

In further features, the CL module is configured to set the CL torque to zero when the CL state is in an inactive state.

In further features, the road load module is configured to determine the road load torque based on the vehicle speed and an axle torque request.

In further features, a CL state module is configured to set the CL state to the active state when the vehicle speed is less than a predetermined speed and a torque request determined based on the position of the accelerator pedal is less than a predetermined torque.

In further features, a target speed module is configured to transition the target vehicle speed to zero over a period when the CL state is in the active state.

In a feature, an electric motor control method for a vehicle includes: determining a road load torque to maintain zero vehicle acceleration; determining an initial torque based on the road load torque; when a closed loop (CL) state transitions from an inactive state to an active state, setting a CL torque to the initial torque; when the CL state is in the active state after transitioning to the active state, adjusting the CL torque based on a difference between a target vehicle speed and a vehicle speed; determining a motor torque command based on the CL torque and a motor torque request determined based on a position of an accelerator pedal; and based on the motor torque command, controlling switching of an inverter and applying power to an electric motor of the vehicle.

In further features, determining the initial torque includes determining the initial torque further based on a driver torque request determined based on the position of the accelerator pedal.

In further features, determining the initial torque includes: determining a change based on a difference between a previous value of the driver torque request and the driver torque request; and determining the initial torque based on the change and the road load torque.

In further features, determining the initial torque includes: determining a change based on a difference between a previous value of the motor torque command and the motor torque command; and determining the initial torque based on the change and the road load torque.

In further features, determining the motor torque command includes determining the motor torque command based on a sum of the CL torque and the motor torque request.

In further features, adjusting the CL torque includes, when the CL state is in the active state after transitioning to the active state, adjusting the CL torque to adjust the vehicle speed toward the target vehicle speed.

In further features, the electric motor control method further includes setting the CL torque to zero when the CL state is in an inactive state.

In further features, determining the road load torque includes determining the road load torque based on the vehicle speed and an axle torque request.

In further features, the electric motor control method further includes setting the CL state to the active state when the vehicle speed is less than a predetermined speed and a torque request determined based on the position of the accelerator pedal is less than a predetermined torque.

In further features, the electric motor control method further includes transitioning the target vehicle speed to zero over a period when the CL state is in the active state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
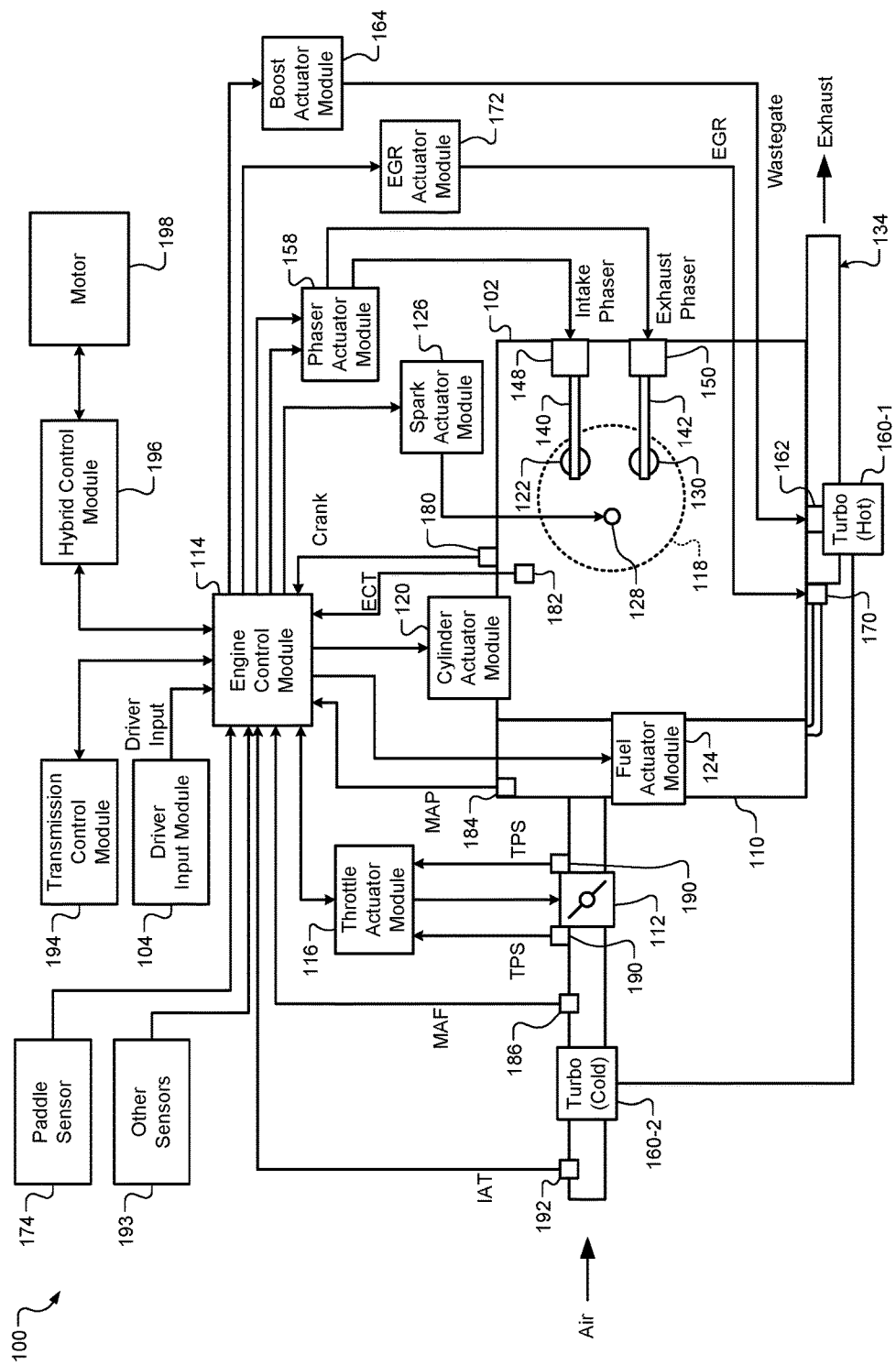
FIG. 1 is a functional block diagram of an example engine system.

A vehicle includes one or more electric motors that can generate propulsion torque for a vehicle. For example, an electric motor may be controlled to output positive torque to a transmission shaft (e.g., transmission input shaft) to propel the vehicle when a driver actuates an accelerator pedal. The positive torque output may be used alone or in combination with torque output of an internal combustion engine to propel the vehicle. The electric motor can also be controlled to output negative propulsion torque under some circumstances, such as to hold the vehicle stationary on a hill.

An electric motor can also be used to convert mechanical energy into electrical energy under some circumstances. For example, an electric motor can be operated to convert mechanical energy into electrical energy when the driver releases the accelerator pedal. Controlling the electric motor to convert mechanical energy into electrical energy may be referred to as regeneration.

In addition to an accelerator pedal and a brake pedal, a vehicle includes an input device (e.g., a paddle, button, switch, etc.) that can be actuated by a driver to input a request to decelerate the vehicle. The driver may actuate the input device, for example, to input a request to decelerate the vehicle down to stop. Use of the input device may enable the driver to slow the vehicle while minimizing the use/wear of mechanical brakes.

A control module of the vehicle includes a closed loop controller that controls the electric motor(s) of the vehicle to control vehicle speed (and therefore deceleration) according to a target vehicle speed profile. According to the present disclosure, when closed loop control begins, the control module initializes the closed loop controller based on a road load torque. This may better prepare the closed loop controller to be able to stop or maintain the vehicle on a grade and minimize a period that the vehicle rolls down a grade.

The control module rate limits a closed loop torque generated by the closed loop controller to limit the size of changes in the closed loop torque. After being rate limited, the control module limits the closed loop torque to between upper and lower torque limits. Under some circumstances, however, limitation of the closed loop torque to the upper or lower torque limit may prevent the closed loop torque from reaching a value sufficient to stop the vehicle. As such, the vehicle may roll at a low speed. The driver may perceive the vehicle as being stopped when the vehicle is actually rolling at the low speed.

According to the present disclosure, when the vehicle speed is within a predetermined low speed range where the driver may not perceive the vehicle as rolling, the control module may increase the upper (positive) torque limit and/or decrease the lower (negative) torque limit. Specifically, the control module increases the upper (positive) torque limit and/or decrease the lower (negative) torque limit when the closed loop controller can be used to bring the vehicle to a stop and counteract the road load torque. This allows the closed loop torque to be used to bring the vehicle to a stop and to prevent the vehicle from rolling at low speeds. When a magnitude of the road load torque is greater than the closed loop controller can counteract, the control module decreases the upper torque limit and/or increases the lower torque limit. This allows the vehicle to roll at a faster speed where the driver may be more likely to perceive the vehicle as rolling.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine or another suitable type of engine. While the example of a vehicle including an engine is presented, the present application is also applicable to vehicles that do not include an engine, such as electric vehicles.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, or 12 cylinders. The ECM 114 may instruct a cylinder actuator module 120 to selectively deactivate some of the cylinders. Deactivating one or more cylinders may improve fuel economy under certain engine operating conditions.

The engine 102 may operate using a four-stroke cycle or another operating cycle. The four strokes of the four-stroke cycle, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include one or more boost devices, such as a turbocharger. The turbocharger includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

The vehicle may include a paddle that a driver can actuate, for example, to decelerate the vehicle in an effort to minimize or prevent the use of mechanical/friction brakes. The driver can apply the mechanical brakes via depressing a brake pedal (not shown). Use of the paddle, however, enables the driver to decelerate the vehicle without the use of the mechanical brakes, thereby minimizing wear of the mechanical brakes. Deceleration may be accomplished, for example, via regenerative braking and/or use of one or more electric motors. A paddle sensor 174 monitors actuation of the paddle and generates a signal indicative of whether the paddle is actuated or not. While the example of a paddle is provided, a button, switch, knob, or another suitable type of actuator may be used. Regenerative braking may additionally or alternatively be performed under some circumstances when the paddle is not actuated. Regenerative braking may be used independently or in combination with mechanical braking.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and one or more electric motors, such as electric motor 198. Electric motors can also be referred to as motor generator units (MGUs). The electric motor 198 can generate torque for the intended direction of travel (sometimes referred to as positive torque) and can generate torque for the direction opposite that of the intended direction of travel (sometimes referred to as negative torque). Negative torque may be used, for example, to hold a vehicle facing down a hill when the vehicle is in drive or another forward gear. The electric motor 198 can also operate as a generator to produce electrical energy, for example, for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders. The ECM 114 generates the target values for the engine actuators to cause the engine 102 to generate a target engine output torque.

Figure 2:
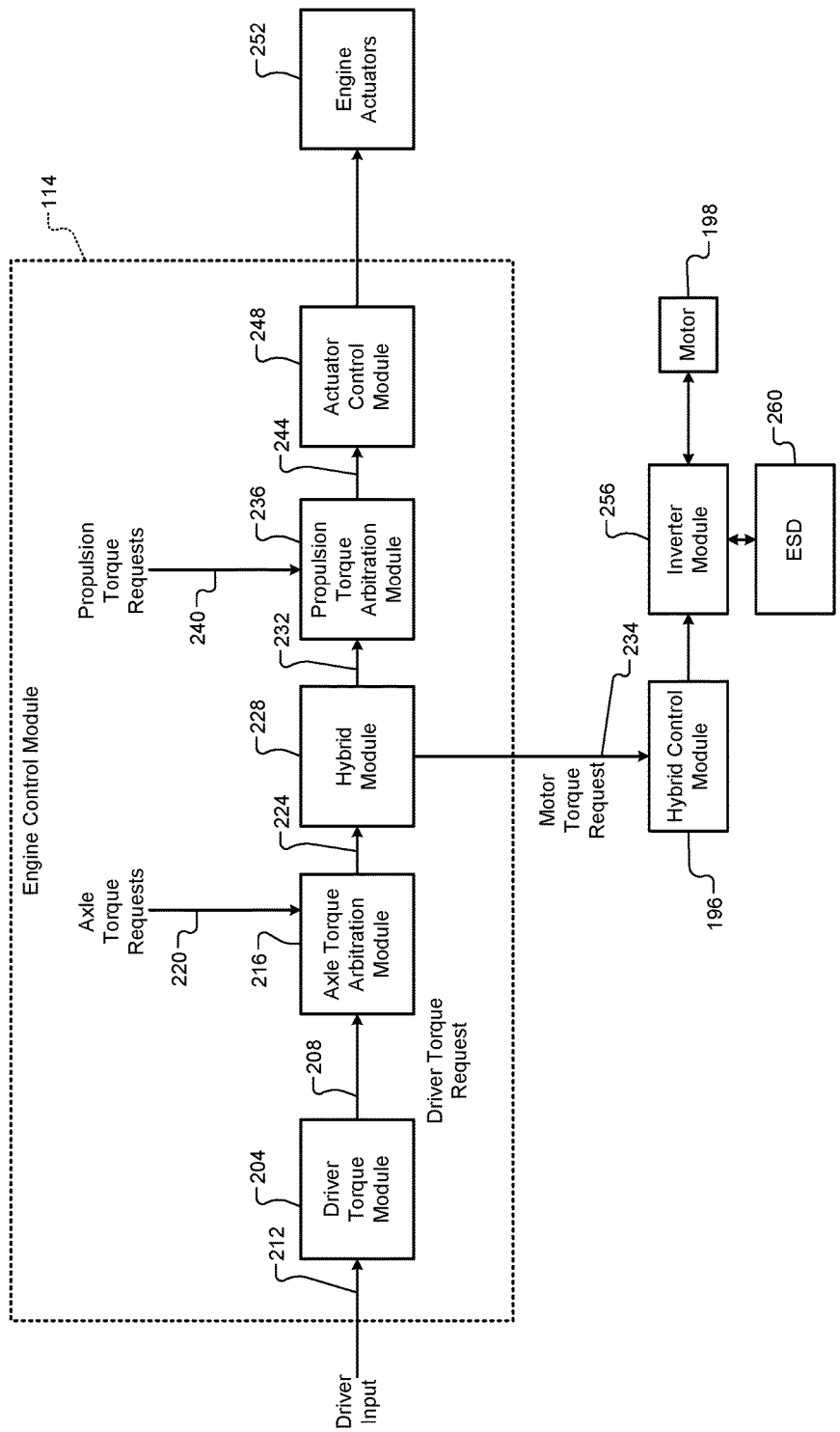
FIG. 2 is a functional block diagram of an example engine control system.

Referring now to FIG. 2, a functional block diagram of an example engine control system is presented. The ECM 114 includes a driver torque module 204 that determines a driver torque request 208 based on driver input 212. The driver input 212 may include, for example, an accelerator pedal position (APP), a brake pedal position (BPP), and/or cruise control input. In various implementations, the cruise control input may be provided by an adaptive cruise control system that attempts to maintain at least a predetermined distance between the vehicle and objects in a path of the vehicle. The driver torque module 204 determine the driver torque request 208 based on one or more lookup tables that relate the driver inputs to driver torque requests. The APP and BPP may be measured using one or more APP sensors and BPP sensors, respectively.

The driver torque request 208 is an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

A hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102. The hybrid module 228 also outputs a motor torque request 234 to the hybrid control module 196. The motor torque request 234 indicates a requested torque output (positive or negative) of the electric motor 198. In vehicles where the engine 102 is omitted or is not connected to output propulsion torque for the vehicle, the axle torque arbitration module 216 may output one axle torque request and the motor torque request 234 may be equal to that axle torque request.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. Based on the propulsion torque requests 244, the actuator control module 248 may control opening of the throttle valve 112, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of the EGR valve 170, and/or one or more other engine actuators. In various implementations, the propulsion torque requests 244 may be adjusted or modified before use by the actuator control module 248, such as to create a torque reserve.

The hybrid control module 196 controls switching of an inverter module 256 based on the motor torque request 234. Switching of the inverter module 256 controls power flow from an energy storage device (ESD) 260, such as one or more batteries, to the electric motor 198. As such, switching of the inverter module 256 controls torque of the electric motor 198. The inverter module 256 also converts power generated by the electric motor 198 and outputs power to the ESD 260, for example, to charge the ESD 260.

Figure 3:
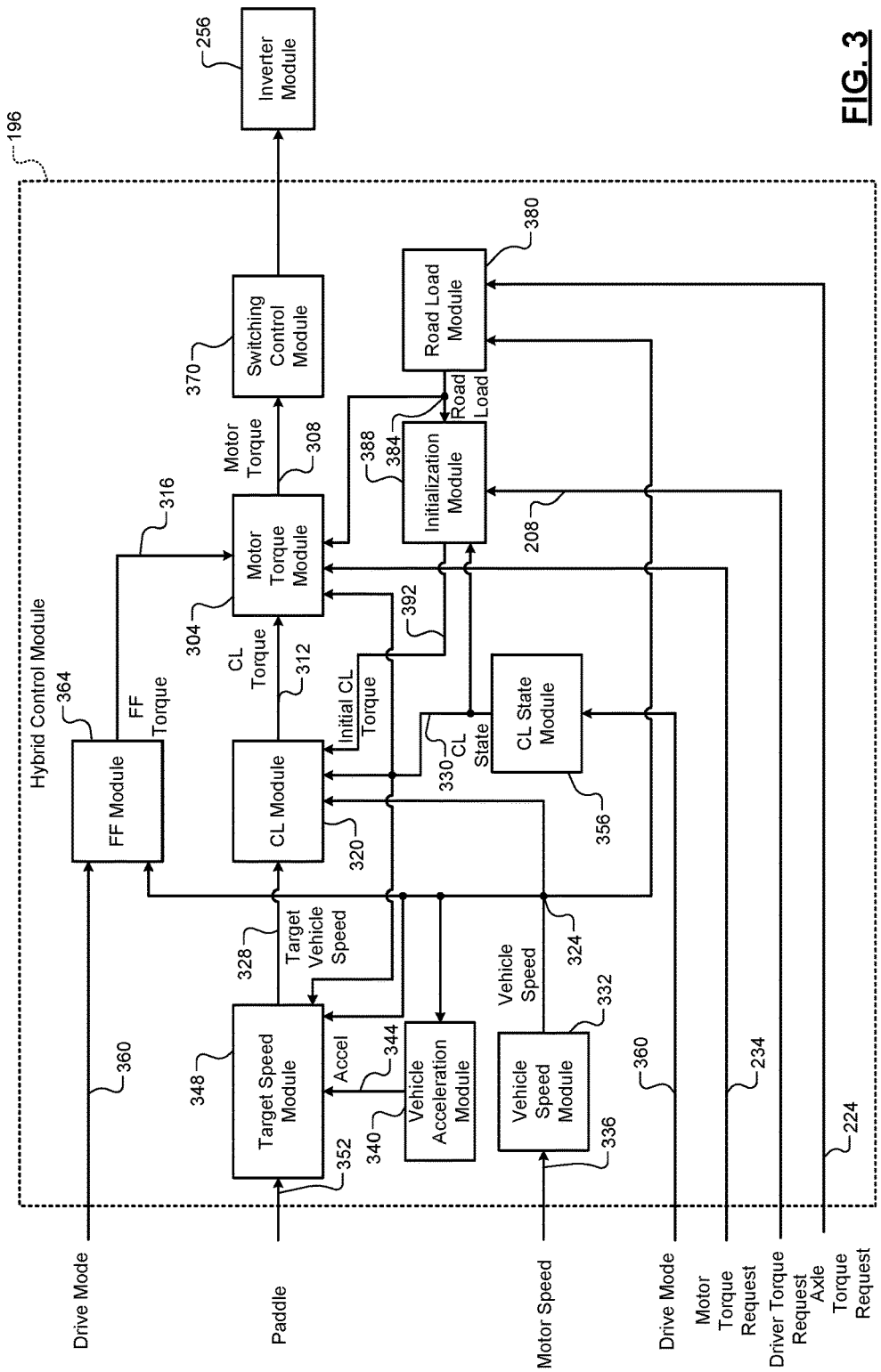
FIG. 3 is a functional block diagram including an example implementation of a hybrid control module.

FIG. 3 includes a functional block diagram of an example implementation of the hybrid control module 196. The hybrid control module 196 includes a motor torque module 304 (see also FIG. 4) that determines a motor torque command 308 for the electric motor 198 based on the motor torque request 234, a closed loop (CL) torque 312, and a feed forward (FF) torque 316.

A CL module 320 determines the CL torque 312. For example, the CL module 320 may determine the CL torque 312 based on adjusting a difference between a vehicle speed 324 and a target vehicle speed 328 toward zero using CL feedback control when a CL state 330 is in an active state. The CL torque 312 may be positive or negative. For example, the CL torque 312 may be negative when the vehicle is rolling (or would roll) forward down a grade while the target vehicle speed 328 is zero. The CL torque 312 being negative causes the electric motor 198 to produce negative torque to stop and maintain the vehicle at zero speed despite facing down the grade.

The CL module 320 may include, for example, a proportional integral (PI) controller that determines the CL torque 312 based on the difference between the vehicle speed 324 and the target vehicle speed 328. For example, the CL module 320 may generate the CL torque 312 to adjust the vehicle speed 324 toward or to the target vehicle speed 328. Stated another way, the CL module 320 may generate the CL torque 312 to adjust a difference between the vehicle speed 324 and the target vehicle speed 328 toward or to zero. While the example of a PI controller is provided, another suitable CL controller may be used.

A vehicle speed module 332 determines the vehicle speed 324. For example, the vehicle speed module 332 may determine the vehicle speed 324 based on a motor speed 336 of the electric motor 198. In the example of multiple electric motors, the vehicle speed module 332 may set the vehicle speed 324, for example, based on or equal to an average of the motor speeds of the electric motors. One or more gear ratios between rotation of an electric motor and rotation of one or more wheels may also be considered. The motor speeds 336 may be measured, for example, using motor speed (or position) sensors associated with the electric motor 198. While the example of determining the vehicle speed 324 based on the motor speed 336 is provided, the vehicle speed 324 may be determined in another suitable manner, such as based on one or more wheel speeds of the vehicle or based on a rotational speed of a shaft of the transmission or the driveline of the vehicle.

A vehicle acceleration module 340 determines a vehicle acceleration 344 based on the vehicle speed 324. For example, the vehicle acceleration module 340 may determine the vehicle speed 324 based on a change in the vehicle speed 324 over a predetermined period, such as one control loop.

A target speed module 348 determines a target vehicle speed profile for a future period and, more specifically, for a future number of control loops when the CL state 330 transitions to the active state. During each control loop while the CL state 330 is in the active state, the target speed module 348 selects a next target vehicle speed from the target vehicle speed profile and sets the target vehicle speed 328 to the selected vehicle speed.

The paddle sensor 174 may generate a paddle state 352 to indicate whether the paddle is actuated. The target speed module 348 may determine the target vehicle speed profile for adjusting the vehicle from the vehicle speed 324 to zero when the paddle state 352 indicates that the paddle is actuated.

The target speed module 348 may determine the target vehicle speed profile for adjusting the vehicle speed 324 (e.g., to zero), for example, based on the vehicle speed 324 and the vehicle acceleration 344 when the CL state 330 transitions to the active state and/or when the paddle state 352 changes while the CL state 330 is in the active state.

The target vehicle speed profile may include three phases, a first phase occurring during a first period of the future period, a second phase occurring during a second period of the future period, and a third phase occurring during a third period of the future period. The first period begins when the enabling condition(s) are satisfied, the second period begins when the first period ends, and the third period begins when the second period ends and corresponds to the end of the future period. Deceleration may increase (i.e., acceleration may decrease) during the first period, deceleration may be approximately constant or minimally decrease during the second period, and deceleration may decrease during the third period.

The target speed module 348 may determine the future period and percentages of the future period for the first, second, and third periods, respectively, based on the vehicle speed 324 and the vehicle acceleration 344 when the enabling condition(s) are met. A sum of the percentages is equal to 100 percent, and each of the percentages is less than or equal to 100 percent.

For example, the target speed module 348 may determine the future period and first, second, and third percentages based on the vehicle speed 324 and the vehicle acceleration 344 using one or more functions and/or mappings that relate vehicle speeds and accelerations to future periods and first, second, and third percentages. The target speed module 348 may then set the first period based on a product of the future period and the first percentage. The target speed module 348 may set the second period based on a product of the future period and the second percentage. The target speed module 348 may set the third period based on a product of the future period and the third percentage. In various implementations, the target speed module 348 may determine the first, second, and third periods directly based on the vehicle speed 324 and the vehicle acceleration 344 when the enabling condition(s) are met.

The target speed module 348 may also determine first, second, and third deceleration rates for the first, second, and third periods of the future period based on the vehicle speed 324 and the vehicle acceleration 344 when the enabling condition(s) are met. For example, the target speed module 348 may determine the first, second, and third deceleration rates based on the vehicle speed 324 and the vehicle acceleration 344 using one or more functions and/or mappings that relate vehicle speeds and accelerations to first, second, and third deceleration rates. One or more of the first, second, and third deceleration rates may be different than one or more other ones of the first, second, and third deceleration rates. The first, second, and/or third deceleration rate may vary within the first, second, or third period, respectively. The deceleration rate at the end of one period, however, may be equal to or within a predetermined amount of the deceleration rate of a beginning of a next period such that no step or large changes in deceleration occur. The target speed module 348 generates the target vehicle speed profile based on achieving the first, second, and third deceleration rates during the first, second, and third periods of the future period. The target vehicle speed profile controls the way that the vehicle is brought to a stop such that bringing the vehicle to a stop may be perceived by a driver as smooth, pleasing, repeatable, and is continuous with vehicle behavior (e.g., deceleration) prior to the CL state 330 transitioning to the active state.

When the CL state 330 is in a suspend state or an inactive state, the target speed module 348 may ramp the target vehicle speed 328 toward the vehicle speed 324 at a predetermined rate.

As stated above, the CL module 320 determines the CL torque 312 to adjust the vehicle speed 324 toward the target vehicle speed 328 when the CL state 330 is active. Written another way, the CL module 320 determines the CL torque 312 to adjust the difference between the vehicle speed 324 and the target vehicle speed 328 toward zero. When the CL state 330 is inactive, the CL module 320 may set (reset) the CL torque 312 to zero. When the CL state 330 is suspend, the CL module 320 may leave the CL torque 312 unchanged and not reset the CL torque 312.

Road grade affects the vehicle speed 324. For example, when in a forward gear, a vehicle may travel faster forward down a grade at given current engine and motor torque outputs than when the vehicle is on a level grade under the same engine and motor torque outputs. A road load module 380 determines a road load (torque) 384 on the vehicle based on the current operating conditions. The road load 384 corresponds to an axle torque to maintain zero acceleration under the current operating conditions. The road load 384 may include both frictional load on the vehicle, aerodynamic drag load on the vehicle, gravity based load on the vehicle, etc.

The road load module 380 determines the road load 384 based on the vehicle speed 324 and one or more of the axle torque requests 224. The road load module 380 may determine the road load 384 using one or more equations and/or lookup tables that relate vehicle speeds and axle torque requests to road loads. For example, based on the one or more of the axle torque requests 224, the road load module 380 may determine an expected vehicle speed under the current operating conditions. Road grade, mass of the vehicle (including things carried by the vehicle), aerodynamic forces, and other forces may cause the vehicle speed 324 to deviate from the expected vehicle speed. A difference between the vehicle speed 324 and the expected vehicle speed may correspond to the road load. An example of determining the road load can be found, for example, in commonly assigned U.S. Pat. No. 7,739,016, which is incorporated herein in its entirety. Generally stated, the road load 384 may be positive or negative depending on whether the transmission is in a forward gear or a reverse gear and whether the vehicle is facing forward up a grade or facing down a grade.

An initialization module 388 stores the driver torque request 208 each predetermined period, such as each control loop. When the CL state 330 transitions from inactive to active, the initialization module 388 determines a change (e.g., percentage) based on a difference between a previously stored driver torque request and the driver torque request 208. For example, the previously stored driver torque request may be from a predetermined period before or a predetermined number of control loops before a present control loop. Alternatively, the previously stored driver torque request may be from when a predetermined event occurred, such as when the driver torque request 208 started to decrease. For example only, the initialization module 388 may set the change based on or equal to:

$$\frac{(PrevDTR - DTR)}{PrevDTR}$$

where PrevDTR is the previously stored DTR and DTR is the driver torque request 208.

In various implementations, the initialization module 388 stores the motor torque command 308 each predetermined period, such as each control loop. When the CL state 330 transitions from inactive to active, the initialization module 388 determines a change (e.g., percentage) based on a difference between a previously stored motor torque command and the motor torque command 308. For example, the previously stored motor torque command may be from a predetermined period before or a predetermined number of control loops before a present control loop. Alternatively, the previously stored motor torque command may be from when a predetermined event occurred, such as when the motor torque command 308 started to decrease. For example only, the initialization module 388 may set the change based on or equal to:

$$\frac{(PrevMTC - MTC)}{PrevMTC}$$

where PrevMTC is the previously stored motor torque command and MTC is the motor torque command 308.

When the CL state 330 transitions from inactive to active, the initialization module 388 sets an initial CL torque 392 based on the road load 384 and the change. The initialization module 388 may set the initial CL torque 392 using one of an equation and a lookup table that relates road loads and change (values) to initial CL torques. For example, the initialization module 388 may set the initial CL torque 392 based on the road load 384 multiplied by the change.

When the CL state 330 transitions to from the inactive state to the active state, the CL module 320 sets the CL torque 312 to the initial CL torque 392. This initializes the CL module 320 based on the road load 384 to allow the CL module 320 to more quickly stabilize the CL torque 312, to more quickly bring the vehicle to a stop, and/or to minimize a period that the vehicle rolls down a grade.

A CL state module 356 sets the CL state 330. For example, when the vehicle speed 324 is less than a predetermined speed, the CL state module 356 may set the CL state 330 to the active state when the driver torque request 208 is zero or less than a predetermined torque. The predetermined speed is greater than zero, such as approximately 5 kilometers per hour or another suitable speed. The predetermined speed is greater than (an upper limit of) a predetermined low speed range discussed below. In various implementations, the motor torque request 234 may be used in place of the driver torque request 208.

Additionally or alternatively, the CL state module 356 may set the CL state 330 to the active state when the vehicle is rolling forward down a grade when a drive mode 360 is in reverse or when the vehicle is moving backward down a grade when the drive mode 360 is drive, low, or another forward gear. The drive mode 360 may be, for example, park, drive, low, neutral, or reverse in some vehicles. The drive mode 360 may be provided based on a position of a park, reverse, neutral, drive, low (PRNDL) selector or lever that is actuated by a user. The purpose for transitioning the CL state 330 to the active state under these circumstances is to actively, using CL control, bring the vehicle to a stop despite the driver requesting torque, either via the accelerator pedal and/or the brake pedal, when the driver's torque request is insufficient to keep the vehicle from rolling in a direction opposite that of intended motion.

The CL state module 356 may set the CL state 330 to the suspend state when the APP and/or the BPP is greater than zero (indicating that the accelerator pedal and/or the brake pedal is depressed/applied) and/or the driver torque request 208 is greater than zero or greater than the predetermined torque while the vehicle speed 324 is less than the predetermined speed. The CL state module 356 may set the CL state 330 to the inactive state when the vehicle speed 324 is outside of a predetermined speed range (e.g., zero to the predetermined speed), occupancy of the driver is not detected, and/or when one or more other conditions are satisfied.

A FF module 364 (see also FIG. 5) determines the FF torque 316 to maintain the vehicle in place on a hill when a driver changes the drive mode 360 from the drive mode to the low mode while the vehicle speed 324 is zero. Under this circumstance, the change in the drive mode 360 may, without the FF module 364, allow the vehicle to roll down a grade. The FF module 364 is discussed further below.

As stated above, the motor torque module 304 determines the motor torque command 308 based on the motor torque request 234, the CL torque 312, and the FF torque 316. A switching control module 370 controls switching of switches of the inverter module 256 to control power flow to and from the electric motor 198 based on the motor torque command 308.

Figure 4:
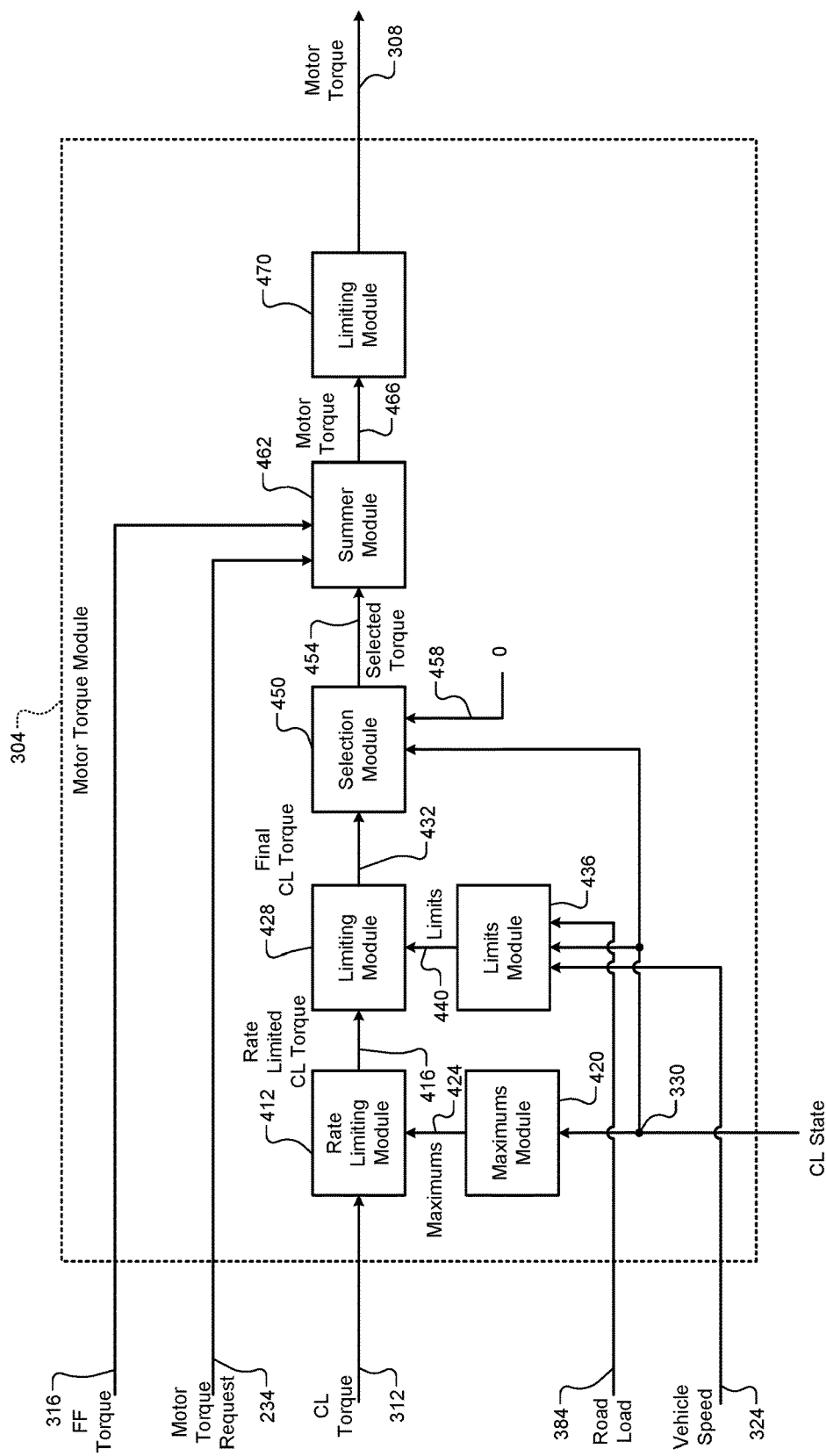
FIG. 4 is a functional block diagram including an example implementation of a motor torque module.

FIG. 4 is a functional block diagram of an example implementation of the motor torque module 304. A rate limiting module 412 produces a rate limited CL torque 416 by rate limiting changes in the CL torque 312 from control loop to control loop to a predetermined maximum amount. More specifically, when the rate limited CL torque 416 is less than the CL torque 312, the rate limiting module 412 increases the rate limited CL torque 416 toward the CL torque 312 by up to a first maximum amount per control loop. When the rate limited CL torque 416 is greater than the CL torque 312, the rate limiting module 412 decreases the rate limited CL torque 416 toward the CL torque 312 by up to a second maximum amount per control loop. The rate limiting module 412 sets the rate limited CL torque 416 to the CL torque 312 when a difference between the rate limited CL torque 416 and the CL torque 312 is less than the one of the first and second maximum amounts. In various implementations, the rate limiting module 412 may not rate limit the CL torque 312 and set the rate limited CL torque 416 equal to the CL torque 312.

Rate limiting changes in the CL torque 312 provides shaping to prevent large changes in the CL torque 312 from being executed between consecutive control loops. The CL torque 312 and the CL module 320 may be said to have stabilized when the difference between the rate limited CL torque 416 and the CL torque 312 is less than the predetermined maximum amount.

The first and second maximum amounts are set by a maximums module 420 and are collectively illustrated by 424. The maximums module 420 sets the first and second maximum amounts 424 to first and second predetermined values, respectively, when the CL state 330 is in the active state. The maximums module 420 sets the first and second maximum amounts 424 to third and fourth predetermined values, respectively, when the CL state 330 is in the suspend state. The first and second predetermined values allow for larger changes per control loop than the third and fourth predetermined values. In other words, the first predetermined value is greater than the third predetermined value, and the second predetermined value is greater than the fourth predetermined value. In various implantations, the first predetermined value may be equal to the second predetermined value, and the third predetermined value may be equal to the fourth predetermined value.

A limiting module 428 limits the rate limited CL torque 416 to within predetermined upper and lower torque limits to produce a final CL torque 432. More specifically, the limiting module 428 sets the final CL torque 432 equal to the rate limited CL torque 416 when the rate limited CL torque 416 is between the predetermined upper and lower torque limits. In other words, the limiting module 428 sets the final CL torque 432 equal to the rate limited CL torque 416 when the rate limited CL torque 416 is both greater than the predetermined lower torque limit and less than the predetermined upper torque limit. When the rate limited CL torque 416 is greater than the predetermined upper torque limit, the limiting module 428 sets the final CL torque 432 to the predetermined upper torque limit. When the rate limited CL torque 416 is less than the predetermined lower torque limit, the limiting module 428 sets the final CL torque 432 to the predetermined lower torque limit.

The predetermined upper and lower torque limits are set by a limits module 436 and are collectively illustrated by 440. The limits module 436 generally sets the predetermined upper and lower torque limits to respective positive and negative predetermined torques. In various implementations, the magnitude of the positive predetermined torque may be equal to the magnitude of the negative predetermined torque.

Under some road load conditions, the limitation of the rate limited CL torque 416 to the predetermined upper torque limit or the predetermined lower torque limit may allow the vehicle to roll at a low (non-zero) speed down a grade that may not be perceived as rolling by a driver. In other words, with the predetermined upper and lower torque limits, the hybrid control module 196 maybe unable to bring the vehicle to a stop and the vehicle may roll at a slow speed that may be imperceptible by the driver.

To prevent vehicle rolling at low speeds when the CL state 330 is active, the limits module 436 adjusts (increases or decreases) the predetermined upper and lower torque limits to allow the vehicle to be brought to a stop or allow the vehicle to roll at a slightly faster speed that is more perceptible by a driver. For example, the limits module 436 determines whether the vehicle speed 324 is within a predetermined low speed range having upper and lower boundaries of the range that are greater than zero. The predetermined low speed range is calibrated based on vehicle speeds between which a driver may not perceive the vehicle as rolling (moving) yet the vehicle is in fact rolling. For example only, the predetermined low speed range may be approximately 0.1-0.3 kilometers per hour (kph) or another suitable low speed range.

When the CL state 330 is active, the limits module 436 may set the predetermined upper and lower torque limits to the predetermined values when the vehicle speed 324 is outside of the predetermined low speed range. The limits module 436 adjusts the predetermined upper and/or lower torque limits when the vehicle speed 324 is within the predetermined low speed range (i.e., less than the upper boundary and greater than the lower boundary) and the CL state 330 is active.

For example, when the transmission is in a forward drive gear facing down a grade, the CL state 330 is active, the vehicle speed 324 is within the predetermined low speed range, and the magnitude of the road load 384 is less than the magnitude of a predetermined maximum negative torque, the limits module 436 may decrease (i.e., make more negative) the predetermined lower torque limit toward (e.g., by a predetermined amount) or up to the predetermined maximum negative torque. This allows the hybrid control module 196 to control the electric motor 198 to output a greater amount of negative torque in an effort to bring the vehicle to a stop. The predetermined maximum negative torque may be calibrated based on a maximum negative value of the final CL torque 432.

As another example, when the transmission is in a reverse drive gear and facing up a grade, the CL state 330 is active, and the magnitude of the road load 384 is less than the magnitude of a predetermined maximum positive torque, the limits module 436 may increase (i.e., make more positive) the predetermined upper torque limit toward (e.g., by a predetermined amount) or up to the predetermined maximum positive torque. This allows the hybrid control module 196 to control the electric motor 198 to output a greater amount of positive torque in an effort to bring the vehicle to a stop. The predetermined maximum positive torque may be calibrated based on a maximum positive value of the final CL torque 432.

In various implementations, the magnitudes of the predetermined maximum positive and negative torques may be equal. The limits module 436 may compare a magnitude of the road load torque 384 with the magnitude of the predetermined maximum positive torque and/or the magnitude of the predetermined maximum negative torque.

If the vehicle speed 324 becomes zero while the limits module 436 is adjusting the upper and/or lower torque limits, the limits module 436 may maintain the upper and lower torque limits to hold the vehicle stopped. A body control module may also apply one or more mechanical brakes (e.g., a parking brake) of the vehicle. In various implementations, if the vehicle speed 324 becomes zero (e.g., continuously for at least a predetermined period, the limits module 436 may set the upper and lower torque limits to the predetermined maximum positive and negative torques, respectively.

When the transmission is in a forward drive gear facing down a grade, the CL state 330 is active, the vehicle speed 324 is within the predetermined low speed range, and the magnitude of the road load 384 is greater than or equal to the magnitude of the predetermined maximum negative torque, the hybrid control module 196 may not be able to bring the vehicle to a stop. As such, the limits module 436 may increase (i.e., make less negative) the predetermined lower torque limit e.g., by a predetermined amount. The electric motor 198 then outputs a lesser amount of negative torque in an effort to allow the vehicle to roll at a speed that is above the predetermined low speed range. Vehicle movement above the predetermined low speed range may be more perceptible by the driver and may, for example, cause the driver to apply mechanical brakes or actuate the accelerator pedal.

As another example, when the transmission is in a reverse drive gear and the vehicle is facing up a grade, the CL state 330 is active, and the magnitude of the road load 384 is greater than or equal to the magnitude of the predetermined maximum positive torque, the hybrid control module 196 may not be able to bring the vehicle to a stop. As such, the limits module 436 may decrease (i.e., make less positive) the predetermined upper torque limit by a predetermined amount. The electric motor 198 then outputs a lesser amount of positive torque in an effort to allow the vehicle to roll at a speed that is above the predetermined low speed range. Vehicle movement above the predetermined low speed range may be more perceptible by the driver and cause the driver to apply mechanical brakes or actuate the accelerator pedal.

In various implementations, the ordering of the rate limit module 412 and the limiting module 428 may be switched. In other words, the limiting performed by the limiting module 428 may be applied and the rate limit module 412 may rate limit the output of the limiting module 428 to produce the final CL torque 432.

A selection module 450 sets a selected torque 454 to one of the final CL torque 432 and zero 458 based on the CL state 330. More specifically, the selection module 450 sets the selected torque 454 to the final CL torque 432 when the CL state 330 is in the active state. The selection module 450 sets the selected torque 454 to zero 458 when the CL state 330 is in the inactive state. The selection module 450 may also set the selected torque 454 to zero 458 when the CL state 330 is in the suspend state.

A summer module 462 sets an initial motor torque command 466 based on or equal to a sum of the selected torque 454, the motor torque request 234, and the FF torque 316. A limiting module 470 limits the initial motor torque command 466 to between upper and lower torque limits, inclusive, and outputs the result as the motor torque command 308. The upper and lower torque limits may be fixed predetermined values or the limiting module 470 may determine the upper and lower limits based on one or more present operating parameters, such as state of charge of the ESD 260. In various implementations, the limiting module 470 may also rate limit changes in the motor torque command 308.

In various implementations, another selection module may be implemented that allows the selected torque 454 (or the final CL torque 432, the rate limited CL torque 416, or the CL torque 312) to be either (i) input to the summer module 462 as in the example of FIG. 4 or (ii) input to another summer module for addition to the output of the limiting module 470. In the example of (ii), the sum of the FF torque 316 and the motor torque request 234 would be limited and rate limited by the limiting module 470 before the result is summed with the selected torque 454 (or the final CL torque 432, the rate limited CL torque 416, or the CL torque 312) to produce the motor torque command 308.

Figure 5:
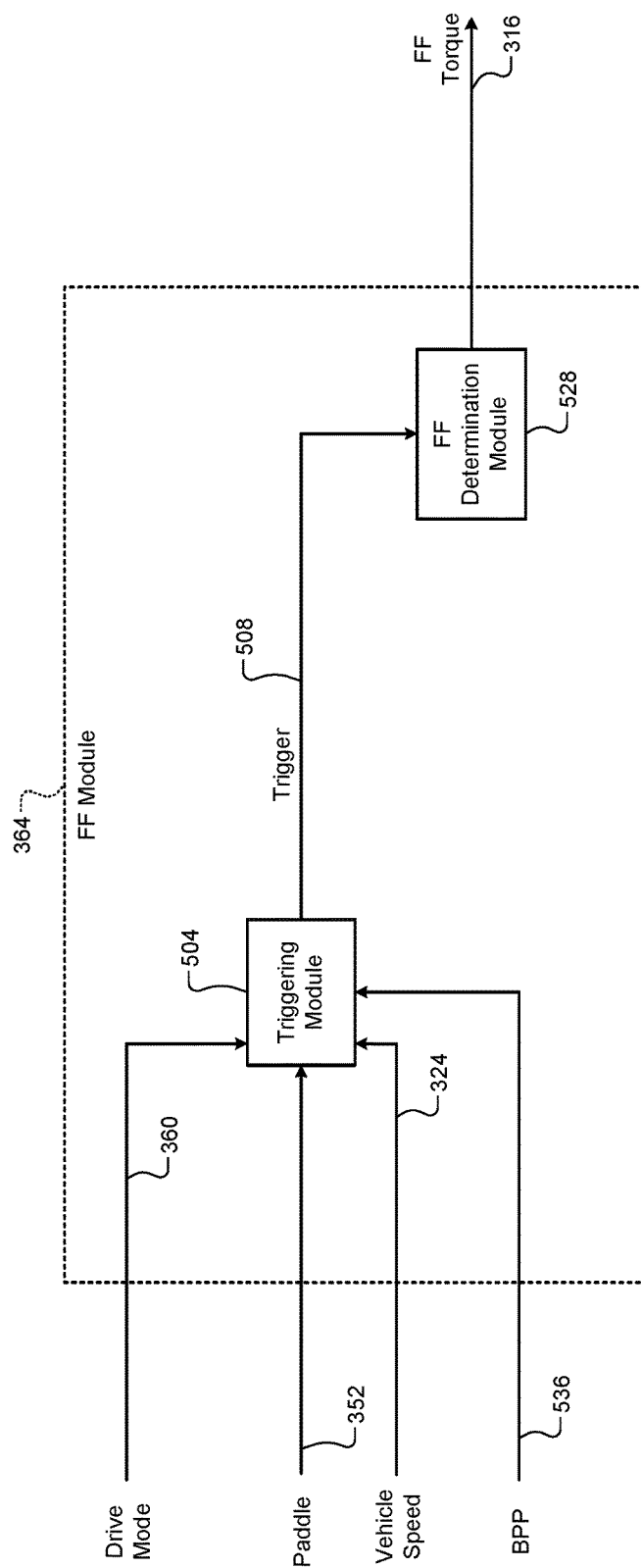
FIG. 5 is a functional block diagram including an example implementation of a feedforward (FF) module.

FIG. 5 is a functional block diagram of an example implementation of the FF module 364. A triggering module 504 selectively generates a trigger signal 508 based on the drive mode 360 and the vehicle speed 324. More specifically, the triggering module 504 generates the trigger signal 508 when all of: (i) the drive mode 360 transitions from drive to low; (ii) the vehicle speed 324 is zero (and the target vehicle speed 328 is also zero); and (iii) a brake pedal position (BPP) 536 indicates that the driver is not applying the brake pedal (e.g., BPP=0). The triggering module 504 may not generate the trigger signal 508 when at least one of (i), (ii), and (iii) is/are not met. When the drive mode 360 transitions from drive to low while the vehicle speed 324 is zero, the vehicle may move when the vehicle is on a non-zero grade. In such circumstances, the CL module 320 would respond by generating the CL torque 312 to bring the vehicle speed 324 back to zero, but the vehicle would move. The FF module 364 minimizes or prevents vehicle movement under such circumstances.

When the trigger signal 508 is generated, a FF determination module 528 determines the FF torque 316 to prevent vehicle movement despite the change in the drive mode 360 from drive to low. The FF determination module 528 determines the FF torque 316 based on the drive mode 360 transitioning from drive to low. The FF torque 316 may be a fixed predetermined value calibrated to maintain the vehicle stopped when the drive mode 360 transitions to low.

Figure 6:
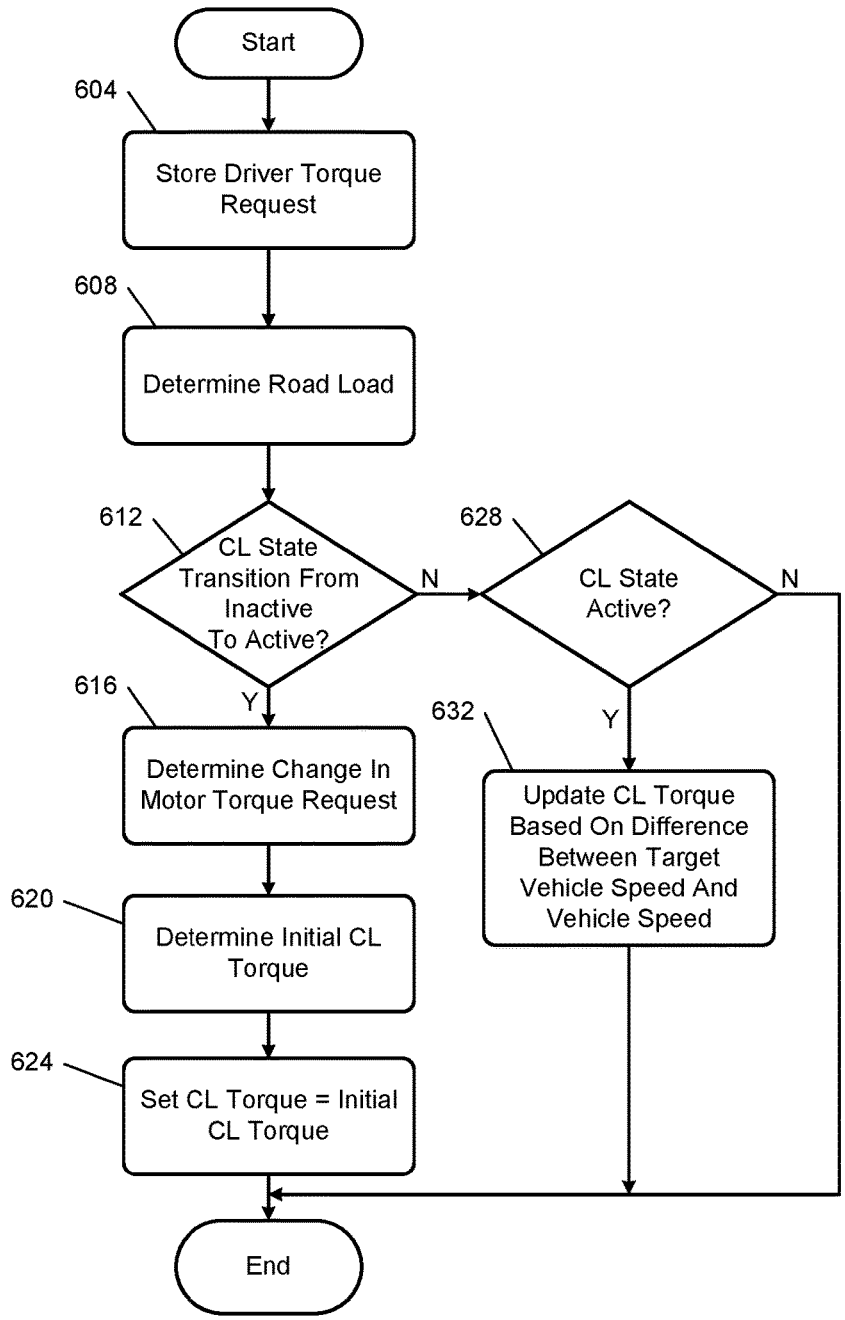
FIG. 6 is a flowchart depicting an example method of setting a closed-loop torque for electric motor control.

FIG. 6 is a flowchart depicting an example method of setting the CL torque 312. As described above, the CL module 320 may set the CL torque 312 based on reducing a difference between the vehicle speed 324 and the target vehicle speed 328 to zero. Control begins with 604 where the initialization module 388 stores the driver torque request 208. The vehicle speed 324 may be zero or non-zero at 604. The initialization module 388 stores the driver torque request 208 each control loop. A previously stored driver torque request (from a previous control loop) will be used to determine the change when the CL state 330 transitions from inactive to active.

At 608, the road load module 380 determines the road load (torque) 384, as described above. At 612, the CL module 320 and the initialization module 388 determine whether the CL state 330 has transitioned from the inactive state to the active state. If 612 is true, control continues with 616. If 612 is false, control transfers to 628, which is discussed further below.

The initialization module 388 determines the change, for example, based on the driver torque request 208 and the previously stored driver torque request. For example, the previously stored driver torque request may be from a predetermined period before or a predetermined number of control loops before a present control loop. Alternatively, the previously stored driver torque request may be from when a predetermined event occurred, such as when the driver torque request 208 started to decrease. For example only, the initialization module 388 may set the change based on or equal to:

$$\frac{(PrevDTR - DTR)}{PrevDTR}$$

where PrevDTR is the previously stored DTR and DTR is the driver torque request 208.

Alternatively, the initialization module 388 determines the change based on the previously stored motor torque command and the motor torque command 308. For example, the previously stored motor torque command may be from a predetermined period before or a predetermined number of control loops before a present control loop. Alternatively, the previously stored motor torque command may be from when a predetermined event occurred, such as when the motor torque command 308 started to decrease. For example only, the initialization module 388 may set the change based on or equal to:

$$\frac{(PrevMTC - MTC)}{PrevMTC}$$

where PrevMTC is the previously stored motor torque command and MTC is the motor torque command 308.

The initialization module 388 determines the initial CL torque 392 based on the road load 384 and the change at 620. For example, the initialization module 388 may set the initial CL torque 392 to the road load 384 multiplied by the change. At 624, the CL module 320 sets the CL torque 312 equal to the initial CL torque 392. The motor torque module 304 then determines the motor torque command 308 based on the CL torque 312. The switching control module 370 controls switching of switches of the inverter module 256 based on the motor torque command 308. The inverter module 256 therefore applies power to the electric motor 198 based on achieving the motor torque command 308.

Referring back to 628, the CL module 320 may determine whether the CL state 330 is in the active state and was previously in the active state (i.e., did not transition from the inactive state to the active state in the present control loop). If 628 is true, the CL module 320 updates the CL torque 312 based on adjusting the vehicle speed 324 toward the target vehicle speed 328 at 632. The motor torque module 304 then determines the motor torque command 308 based on the CL torque 312.

The switching control module 370 controls switching of switches of the inverter module 256 based on the motor torque command 308. The inverter module 256 therefore applies power to the electric motor 198 based on achieving the motor torque command 308. If 628 is false, control may end. As discussed above, if the CL state 330 is in the inactive state, the CL module 320 may reset the CL torque 312. If the CL state 330 is in the suspend state, the CL module 320 may leave the CL torque 312 unchanged. While control is shown and discussed as ending, the example of FIG. 6 corresponds to one control loop and a control loop may be started each predetermined period.

Figure 7:
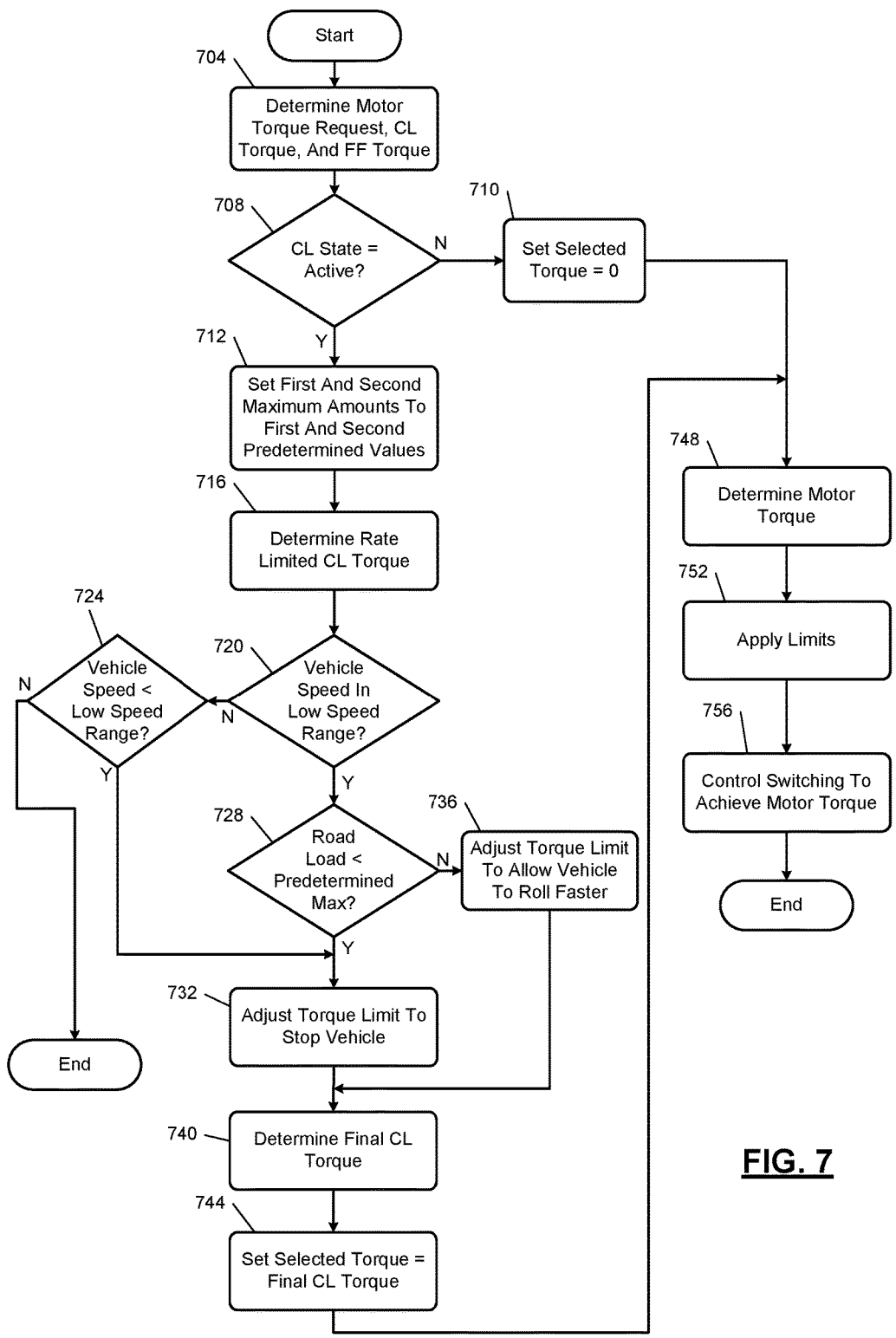
FIG. 7 is a flowchart depicting an example method of controlling an electric motor.

FIG. 7 includes a flowchart depicting an example method of controlling an electric motor. Control begins with 704 where the hybrid module 228 determines the motor torque request 234, the CL module 320 determines the CL torque 312, and the FF module determines the FF torque 316. At 708, the selection module 450 determines whether the CL state 330 is in the active state. If 708 is true, control continues with 712 and the selected torque 454 will be set based on the CL torque 312. If 708 is false, the selection module 450 sets the selected torque 454 to zero 458 at 710, and control transfers to 748, which is discussed further below.

At 712, the maximums module 420 sets the first and second maximum amounts to the first and second predetermined values. At 716, the rate limiting module 412 produces the rate limited CL torque 416 by rate limiting changes in the CL torque 312. More specifically, when the rate limited CL torque 416 is less than the CL torque 312, the rate limiting module 412 increases the rate limited CL torque 416 toward the CL torque 312 by up to the first maximum amount. When the difference between the rate limited CL torque 416 and the CL torque 312 is less than the first maximum amount, the rate limiting module 412 sets the rate limited CL torque 416 to the CL torque 312. Conversely, when the rate limited CL torque 416 is greater than the CL torque 312, the rate limiting module 412 decreases the rate limited CL torque 416 toward the CL torque 312 by up to the second maximum amount. When the difference between the rate limited CL torque 416 and the CL torque 312 is less than the second maximum amount, the rate limiting module 412 sets the rate limited CL torque 416 to the CL torque 312.

At 720, the limits module 436 determines whether the vehicle speed 324 is within the predetermined low speed range where vehicle motion may not be perceived by the driver. If 720 is true, control continues with 728. If 720 is false, the limits module 436 determines whether the vehicle speed 324 is less than the (lower speed boundary) of the predetermined low speed range at 724. For example, the limits module 436 may determine whether the vehicle speed 324 has been equal to zero continuously for at least a predetermined period at 724. If 724 is false, control may end. If 724 is true, the limits module 436 may set the predetermined upper and lower torque limits to the predetermined maximum positive and negative torques, respectively, at 732 and continue with 740. This may help to ensure that the vehicle remains stopped. In various implementations, if 728 is true, the limits module 436 may instead maintain the predetermined upper and lower torque limits imposed by the limiting module 428, and control may continue with 740.

At 728 (when the vehicle speed 324 is within the predetermined low speed range), the limits module 436 determines whether the road load 384 is within predetermined maximum torque limits of the limiting module 428. For example, when the transmission is in a forward drive gear and facing down a grade (as indicated by the road load 384 being negative), the limits module 436 may determine whether the road load 384 is less than (i.e., more negative than) the predetermined maximum negative torque at 728. Alternatively, the limits module 436 may determine whether the magnitude of the road load 384 is greater than the magnitude of the predetermined maximum negative torque. When the transmission is in a reverse drive gear and facing up a grade (as indicated by the road load 384 being positive), the limits module 436 may determine whether the road load 384 is greater than (i.e., more positive than) the predetermined maximum positive torque at 728.

If 728 is true, the limits module 436 adjusts at least one of the predetermined upper and lower torque limits in an effort to allow the CL torque to be used to bring the vehicle to a stop at 732, and control continues with 740. For example, the limits module 436 may increase the predetermined upper torque limit toward (e.g., by a predetermined amount) or to the predetermined maximum positive torque. The limits module 436 may additionally or alternatively decrease the predetermined lower torque limit toward (e.g., by a predetermined amount) or to the predetermined maximum negative torque. This allows the hybrid control module 196 to control the electric motor 198 to output a greater amount of positive or negative torque in an effort to bring the vehicle to a stop on the grade.

If 728 is false, the limits module 436 adjusts at least one of the predetermined upper and lower torque limits in an effort to allow the vehicle to roll faster at 736, and control continues with 740. For example, the limits module 436 may decrease the predetermined upper torque limit (e.g., by a predetermined amount) toward zero. The limits module 436 may additionally or alternatively increase the predetermined lower torque limit (e.g., by a predetermined amount) toward zero. This limits the ability of the CL torque 312 to affect the motor torque command 308. As a result, the hybrid control module 196 controls the electric motor 198 to output less torque (positive or negative) to allow the vehicle to roll at a faster speed that may be more readily perceived by the driver. If the vehicle continues to roll at a low speed (within the predetermined low speed range), the limits module 436 may further adjust at least one of the predetermined upper and lower torque limits at a next iteration of 736 again in an effort to allow the vehicle to roll faster.

At 740, the limiting module 428 limits the rate limited CL torque 416 to between the predetermined upper and lower torque limits to produce the final CL torque 432. If the rate limited CL torque 416 is greater than the predetermined upper torque limit, the limiting module 428 sets the final CL torque 432 equal to the predetermined upper torque limit. If the rate limited CL torque 416 is less than the predetermined lower torque limit, the limiting module 428 sets the final CL torque 432 equal to the predetermined lower torque limit.

At 744, based on the CL state 330 being in the active state, the selection module 450 sets the selected torque 454 to the final CL torque 432. At 748, the summer module 462 determines the initial motor torque command 466 based on the motor torque request 234, the selected torque 454, and the FF torque 316. For example, the summer module 462 may set the initial motor torque command 466 based on or equal to a sum of the motor torque request 234, the selected torque 454, and the FF torque 316.

The limiting module 428 limits the initial motor torque command 466 to between the upper and lower torque limits at 752 to produce the motor torque command 308. More specifically, when the initial motor torque command 466 is between the upper and lower torque limits, the limiting module 470 sets the motor torque command 308 equal to or based on the initial motor torque command 466. When the initial motor torque command 466 is greater than the upper torque limit, the limiting module 470 sets the motor torque command 308 to the upper torque limit. When the initial motor torque command 466 is less than the lower torque limit, the limiting module 470 sets the motor torque command 308 to the lower torque limit.

At 756, the switching control module 370 controls switching of switches of the inverter module 256 based on the motor torque command 308. The inverter module 256 therefore applies power to the electric motor 198 based on achieving the motor torque command 308. While control is shown and discussed as ending, the example of FIG. 7 corresponds to one control loop and a control loop may be started each predetermined period.

Figure 8:
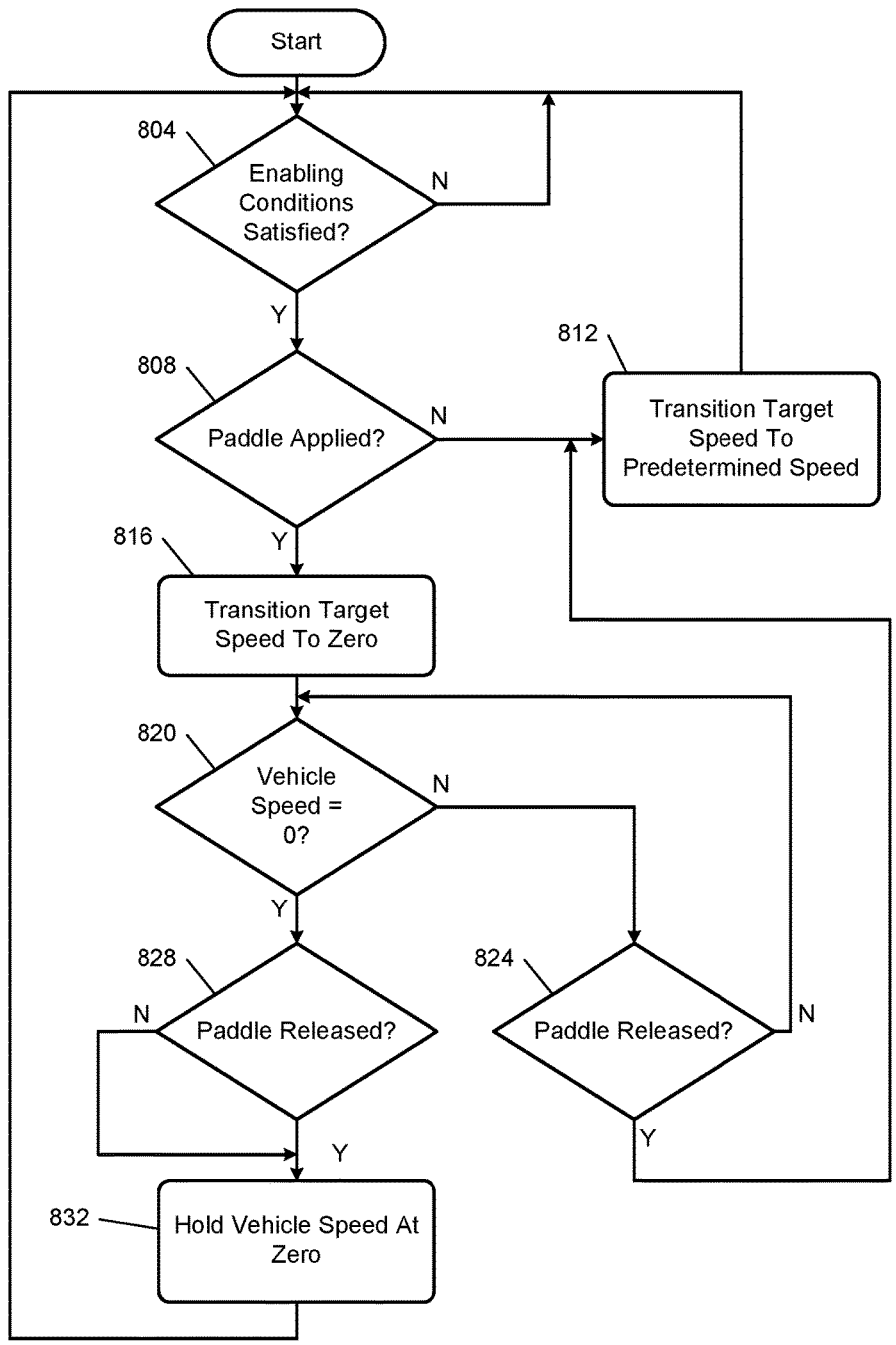
FIG. 8 is a flowchart depicting an example method of setting a target vehicle speed and controlling an electric motor.

FIG. 8 is a flowchart depicting an example method of setting a target vehicle speed and controlling an electric motor. Control begins with 804 where the target speed module 348 determines whether one or more enabling conditions are satisfied. For example, the target speed module 348 may determine whether the accelerator pedal and the brake pedal are not depressed, and the vehicle speed 324 is less than a predetermined speed. The predetermined speed is greater than zero and may be less than 10 miles per hour as an example. If 804 is true, control continues with 808. If 804 is false, control may return to 804.

At 808, the target speed module 348 determines whether the paddle state 352 indicates that the paddle is actuated by the driver. If 808 is false, the target speed module 348 generates the target speed profile to transition the target vehicle speed 328 to a second predetermined speed over the future period at 812, and control returns to 804. The second predetermined speed is greater than zero and may be less than the predetermined speed. The target speed module 348 may determine the target speed profile based on the vehicle speed 324 and the vehicle acceleration 344, as discussed above. The target speed module 348 may determine the target speed profile further based on the drive mode 360. For example, the target speed module 348 may generate the target speed profile to transition the target vehicle speed 328 over a shorter period when the drive mode 360 is in the low mode relative to when the drive mode 360 is in the drive mode.

The CL module 320 generates the CL torque 312 to reduce the difference between the target vehicle speed 328 and the vehicle speed 324 to zero. The switching control module 370 therefore controls switching of the inverter module 256 and therefore torque output of the electric motor 198 based on reducing the difference between the target vehicle speed 328 and the vehicle speed 324 to zero. If 808 is true, control continues with 816.

The target speed module 348 generates the target speed profile to transition the target vehicle speed 328 to zero over the predetermined period at 816. The target speed module 348 may determine the target speed profile based on the vehicle speed 324 and the vehicle acceleration 344, as discussed above. The target speed module 348 may determine the target speed profile further based on the drive mode 360. For example, the target speed module 348 may generate the target speed profile to transition the target vehicle speed 328 over a shorter period when the drive mode 360 is in the low mode relative to when the drive mode 360 is in the drive mode.

At 820, the target speed module 348 determines whether the vehicle speed 324 has reached zero (in response to the driver actuating the paddle). If 820 is false, the target speed module 348 determines whether the paddle state 352 indicates that the driver has released the paddle at 824. If 824 is false, control may return to 820. If 824 is true, control may return to 812 where the target speed module 348 generates the target speed profile to transition the target vehicle speed 328 to the predetermined speed.

If 820 is true, control continues with 828. At 828, the target speed module 348 may determine whether the paddle state 352 indicates that the driver has released the paddle. The driver can release the paddle and the hybrid control module 196 will at least attempt to maintain the vehicle stationary, even on non-zero grades. For example, maintaining the vehicle stationary may be accomplished via the FF module 364 and the FF torque 316, as described above. The target speed module 348 also maintains the target vehicle speed 328 at zero. As such, when 828 is true or false, the hybrid control module 196 controls power application to the electric motor 198 to maintain the vehicle stationary at 832 until one or more disabling conditions are satisfied. The disabling conditions may include, for example, the driver actuating the brake pedal and/or the accelerator pedal. Control may then return to 804.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An electric motor control system for a vehicle, comprising:
   a road load module configured to determine a road load torque to maintain zero vehicle acceleration;
   an initialization module configured to determine an initial torque based on the road load torque;
   a closed loop (CL) module configured to:
      when a CL state transitions from an inactive state to an active state, set a CL torque to the initial torque; and
      when the CL state is in the active state after transitioning to the active state, adjust the CL torque based on a difference between a target vehicle speed and a vehicle speed;
   a motor torque module configured to determine a motor torque command based on the CL torque and a motor torque request determined based on a position of an accelerator pedal; and
   a switching control module configured to, based on the motor torque command, control switching of an inverter and apply power to an electric motor of the vehicle.

2. The electric motor control system of claim 1 wherein the initialization module is configured to determine the initial torque further based on a driver torque request determined based on the position of the accelerator pedal.

3. The electric motor control system of claim 2 wherein the initialization module is configured to:
   determine a change based on a difference between a previous value of the driver torque request and the driver torque request; and
   determine the initial torque based on the change and the road load torque.

4. The electric motor control system of claim 2 wherein the initialization module is configured to:
   determine a change based on a difference between a previous value of the motor torque command and the motor torque command; and
   determine the initial torque based on the change and the road load torque.

5. The electric motor control system of claim 1 wherein the motor torque module is configured to determine the motor torque command based on a sum of the CL torque and the motor torque request.

6. The electric motor control system of claim 1 wherein the CL module is configured to, when the CL state is in the active state after transitioning to the active state, adjust the CL torque to adjust the vehicle speed toward the target vehicle speed.

7. The electric motor control system of claim 1 wherein the CL module is configured to set the CL torque to zero when the CL state is in an inactive state.

8. The electric motor control system of claim 1 wherein the road load module is configured to determine the road load torque based on the vehicle speed and an axle torque request.

9. The electric motor control system of claim 1 further comprising a CL state module configured to set the CL state to the active state when the vehicle speed is less than a predetermined speed and a torque request determined based on the position of the accelerator pedal is less than a predetermined torque.

10. The electric motor control system of claim 1 further comprising a target speed module configured to transition the target vehicle speed to zero over a period when the CL state is in the active state.

11. An electric motor control method for a vehicle, comprising:

determining a road load torque to maintain zero vehicle acceleration;

determining an initial torque based on the road load torque;

when a closed loop (CL) state transitions from an inactive state to an active state, setting a CL torque to the initial torque;

when the CL state is in the active state after transitioning to the active state, adjusting the CL torque based on a difference between a target vehicle speed and a vehicle speed;

determining a motor torque command based on the CL torque and a motor torque request determined based on a position of an accelerator pedal; and based on the motor torque command, controlling switching of an inverter and applying power to an electric motor of the vehicle.

12. The electric motor control method of claim 11 wherein determining the initial torque includes determining the initial torque further based on a driver torque request determined based on the position of the accelerator pedal.

13. The electric motor control method of claim 12 wherein determining the initial torque includes:

determining a change based on a difference between a previous value of the driver torque request and the driver torque request; and determining the initial torque based on the change and the road load torque.

14. The electric motor control method of claim 12 wherein determining the initial torque includes:

determining a change based on a difference between a previous value of the motor torque command and the motor torque command; and determining the initial torque based on the change and the road load torque.

15. The electric motor control method of claim 11 wherein determining the motor torque command includes determining the motor torque command based on a sum of the CL torque and the motor torque request.

16. The electric motor control method of claim 11 wherein adjusting the CL torque includes, when the CL state is in the active state after transitioning to the active state, adjusting the CL torque to adjust the vehicle speed toward the target vehicle speed.

17. The electric motor control method of claim 11 further comprising setting the CL torque to zero when the CL state is in an inactive state.

18. The electric motor control method of claim 11 wherein determining the road load torque includes determining the road load torque based on the vehicle speed and an axle torque request.

19. The electric motor control method of claim 11 further comprising setting the CL state to the active state when the vehicle speed is less than a predetermined speed and a torque request determined based on the position of the accelerator pedal is less than a predetermined torque.

20. The electric motor control method of claim 11 further comprising transitioning the target vehicle speed to zero over a period when the CL state is in the active state.

* * * * *